United States Patent
Suzuki (10) Patent No.: US 7,463,958 B2
(45) Date of Patent: Dec. 9, 2008

(54) VEHICLE CONTROL APPARATUS AND VEHICLE CONTROL METHOD

(75) Inventor: Naoto Suzuki, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 37 days.

(21) Appl. No.: 10/464,767

(22) Filed: Jun. 19, 2003

(65) Prior Publication Data
US 2004/0006414 A1    Jan. 8, 2004

(30) Foreign Application Priority Data
Jul. 8, 2002    (JP)    ............... 2002-199032

(51) Int. Cl.
*B60L 9/00*    (2006.01)
*B60L 11/00*    (2006.01)

(52) U.S. Cl. ............... 701/22; 701/29; 701/31; 320/132; 180/65.2

(58) Field of Classification Search .......... 701/22, 701/1, 9, 29, 30, 36, 31; 180/170, 179, 65.1, 180/65.2, 65.3, 65.6; 123/349, 350; 318/139, 318/140, 440, 558; 320/132; 903/902–903
See application file for complete search history.

(56) References Cited

U.S. PATENT DOCUMENTS

| | | | |
|---|---|---|---|
| 4,762,194 A * | 8/1988 | Morishita et al. ........... 180/446 |
| 5,140,955 A * | 8/1992 | Sono et al. ................ 123/90.15 |
| 5,212,431 A * | 5/1993 | Origuchi et al. ............. 318/139 |
| 5,280,232 A * | 1/1994 | Kohl et al. .................... 322/23 |
| 5,402,007 A * | 3/1995 | Center et al. .............. 290/40 B |
| 5,550,445 A | 8/1996 | Nii |
| 5,751,137 A * | 5/1998 | Kiuchi et al. ................. 322/14 |
| 5,778,326 A * | 7/1998 | Moroto et al. ................ 701/22 |
| 5,785,137 A | 7/1998 | Reuyl |
| 5,821,706 A | 10/1998 | Koga |
| 5,832,396 A * | 11/1998 | Moroto et al. ................ 701/22 |
| 6,137,250 A * | 10/2000 | Hirano et al. ................ 318/376 |
| 6,215,198 B1 | 4/2001 | Inada et al. |
| 6,362,598 B2 * | 3/2002 | Laig-Horstebrock et al. ........................ 320/132 |

(Continued)

FOREIGN PATENT DOCUMENTS

DE    41 16 899 C2    11/1991

(Continued)

OTHER PUBLICATIONS

The development of fuel cell medium bus; Zeng, Jie; Zhang, Liyan; Feng Kong,; Yuhua Zhang; Industrial Technology, 2008. ICIT 2008. IEEE International Conference on; Apr. 21-24, 2008 pp. 1-5; Digital Object Identifier 10.1109/ICIT.2008.4608526.*

(Continued)

*Primary Examiner*—Cuong H Nguyen
(74) *Attorney, Agent, or Firm*—Oliff & Berridge, PLC (57) ABSTRACT

A vehicle control apparatus which starts an engine to generate electric power, and charges a battery for supplying electric power to a motor with the generated electric power when a state of charge (SOC) of the battery is reduced. The vehicle control apparatus starts the engine earlier when a load of the vehicle is larger than a predetermined set value than when the load is not larger than the predetermined set value.

22 Claims, 4 Drawing Sheets

U.S. PATENT DOCUMENTS

| | | | |
|---|---|---|---|
| 6,408,968 B1 * | 6/2002 | Wakashiro et al. | 180/65.3 |
| 6,429,613 B2 | 8/2002 | Yanase et al. | |
| 6,515,448 B2 * | 2/2003 | Iritani et al. | 320/104 |
| 6,624,529 B2 * | 9/2003 | Obayashi | 290/40 C |
| 6,897,629 B2 * | 5/2005 | Wilton et al. | 318/139 |
| 6,909,287 B2 * | 6/2005 | Bertness | 324/427 |
| 7,295,014 B2 * | 11/2007 | Koch et al. | 324/432 |
| 2001/0020833 A1 | 9/2001 | Yanase et al. | |
| 2001/0035739 A1 * | 11/2001 | Laig-Horstebrock et al. | 320/132 |
| 2002/0079853 A1 * | 6/2002 | Schmitz et al. | 318/434 |
| 2003/0217876 A1 * | 11/2003 | Severinsky et al. | 180/65.2 |
| 2004/0084232 A1 * | 5/2004 | Obayashi | 180/65.2 |
| 2005/0062458 A1 * | 3/2005 | Koch et al. | 320/132 |
| 2005/0269875 A1 * | 12/2005 | Maki et al. | 303/152 |
| 2006/0276287 A1 * | 12/2006 | Lang et al. | 475/5 |
| 2007/0272455 A1 * | 11/2007 | Lang et al. | 180/65.2 |
| 2008/0129252 A1 * | 6/2008 | Nishino | 320/162 |
| 2008/0147259 A1 * | 6/2008 | Choi | 701/22 |

FOREIGN PATENT DOCUMENTS

| | | | |
|---|---|---|---|
| EP | 0 645 278 A1 | | 9/1994 |
| EP | 1 127 734 A2 | | 8/2001 |
| EP | 1150131 A1 | * | 10/2001 |
| JP | 06-141406 A | | 5/1994 |
| JP | 07-284201 | | 10/1995 |
| JP | 09-93715 | | 4/1997 |
| JP | 09-193675 A | | 7/1997 |
| JP | 10-014296 A | | 1/1998 |
| JP | 11-041714 | | 2/1999 |
| JP | A-11-103503 | | 4/1999 |
| JP | 11-146503 A | | 5/1999 |
| JP | 2000-50412 A | | 2/2000 |
| JP | 2000 295707 A | | 10/2000 |
| JP | 2000-324615 A | | 11/2000 |
| JP | 2001095105 A | * | 4/2001 |
| JP | 2001169408 A | * | 6/2001 |
| JP | 2001 238304 A | | 8/2001 |
| JP | 2002354612 A | * | 12/2002 |
| JP | 2002367613 A | * | 12/2002 |
| JP | 2004062254 A | * | 2/2004 |
| JP | 2008150014 A | * | 7/2008 |
| JP | 2008167642 A | * | 7/2008 |

OTHER PUBLICATIONS

Modeling and Control of a Four Wheel Drive Parallel Hybrid Electric Vehicle; Boyali, A.; Demirci, M.; Acarman, T.; Guvenc, L.; Tur, O.; Ucarol, H.; Kiray, B.; Ozatay, E.; Control Applications, 2006. CCA '06. IEEE International Conference on Oct. 2006 pp. 155-162; Digital Object Identifier 10.1109/CCA.2006.285885.*

An electric vehicle for recreational areas and local traffic; Pavuza, F.G.; Beszedics, G.; Toriser, W.; Wawra, M.; Winkler, W.;Southcon/ 96. Conference Record, Jun. 25-27, 1996 pp. 281-283, Digital Object Identifier 10.1109/SOUTHC.1996.535079.*

Optimal power distribution control for parallel hybrid electric vehicles; Kyoungcheol Oh; Jeongmin Kim; Dongho Kim; Donghoon Choi; Hyunsoo Kim; Vehicular Electronics and Safety, 2005. IEEE International Conference on; Oct. 14-16, 2005 pp. 79-85 Digital Object Identifier 10.1109/ICVES.2005.1563618.*

Optimization of Switching Rule and Operating Modes of Hybrid Electric Vehicles; Zheng Wei; Chan, C.C.; Cui Shumei; SICE-ICASE, 2006. International Joint Conference; Oct. 2006 pp. 2412-2415; Digital Object Identifier 10.1109/SICE.2006.315111.*

Systematic Fuel Reduction Strategies of Series Hybrid Transit Bus; Guijun Cao; Bin He; Liangfei Xu; Jianqiu Li; Minggao Ouyang; Control Applications, 2007. CCA 2007. IEEE International Conference on; Oct. 1-3, 2007 pp. 1376-1381; Digital Object Identifier 10.1109/CCA.2007.4389428.*

Systematic Fuel Reduction Strategies of Series Hybrid Transit Bus; Cao, Guijun; He, Bin; Xu, Liangfei; Li, Jianqiu; Ouyang, Minggao; Intelligent Control, 2007. ISIC 2007. IEEE 22nd International Symposium on; Oct. 1-3, 2007 pp. 1376-1381 Digital Object Identifier 10.1109/ISIC.2007.4359832.*

Dynamic interaction between the electric drive train and fuel cell system for the case of an indirect methanol fuel cell vehicle Hauer, K.-H.; Energy Conversion Engineering Conference and Exhibit, 2000. (IECEC) 35th Intersociety; vol. 2, Jul. 24-28, 2000 pp. 1317-1325 vol. 2; Digital Object Identifier 10.1109/IECEC.2000.870946.*

* cited by examiner

VEHICLE CONTROL APPARATUS AND VEHICLE CONTROL METHOD

INCORPORATION BY REFERENCE

The disclosure of Japanese Patent Application No. 2002-199032filed on Jul. 8, 2002, including the specification, drawings and abstract is incorporated herein by reference in its entirety.

BACKGROUND OF THE INVENTION

1. Field of the Invention

The invention relates to a vehicle control apparatus and a vehicle control method for a hybrid vehicle.

2. Description of the Related Art

Japanese Patent Laid-Open Publication No. 2000-324615 discloses a control apparatus for a hybrid vehicle, which drives an engine and a motor (that is used also as an electric generator) to enable the vehicle to run, and which starts the engine such that the electric generator generates electric power, and charges the battery with the generated electric power when a state of charge (SOC) of a battery is equal to or lower than a lower limit.

However, in a vehicle provided with the aforementioned control apparatus, when a load of the vehicle is large while the vehicle runs using only the driving force of the motor, a load of the battery is large, which may reduce a lifetime of the battery. When a load of a vehicle is large, for example, when a vehicle runs on an ascending slope, when a deadweight is large, when a freezer is operated in a refrigerated vehicle, or when a garbage collector is operated in a garbage collecting vehicle, the SOC of a battery is significantly reduced, a large amount of electric power is discharged from the battery and the battery is charged with a large amount of electric power, in a repeated manner. Accordingly, a temperature of the battery is increased by heat generation at a time of charge/discharge, which reduces the lifetime of the battery. In addition, when the SOC of the battery is reduced suddenly, a speed at which electric power is generated by the electric generator becomes lower than a speed at which the battery is requested to be charged, and the SOC of the battery may become lower than a permissible lower limit. In this case, the lifetime of the battery may be reduced as a result.

SUMMARY OF THE INVENTION

It is an object of the invention to provide a vehicle control apparatus and a vehicle control method which prevents a lifetime of a battery from being reduced.

A first aspect of the invention relates to a vehicle control apparatus which is mounted in a vehicle that runs using a driving power of one of an internal combustion engine and a motor, or driving forces of both of the internal combustion engine and the motor, and which starts the internal combustion engine to generate electric power, and charges a battery for supplying electric power to the motor with the generated electric power when a state of charge (SOC) of the battery has been reduced. The vehicle control apparatus starts the internal combustion engine to generate electric power earlier when a load of the vehicle is larger than a predetermined set value, than when the load is not larger than the predetermined set value, whereby discharge and charge of the battery are repeated at small intervals of time.

Accordingly, when the load of the vehicle is large and a speed at which the SOC of the battery is reduced is high, it is possible to avoid a situation in which a large amount of electric power is discharged from the battery and the battery is charged with a large amount of electric power, and to suppress an increase in a temperature of the battery due to heat generation caused by charge/discharge. Also, even when the SOC of the battery is reduced suddenly, it is possible to avoid a situation in which the SOC of the battery becomes lower than a permissible lower limit, by setting a reference value for determining whether there is a request for starting an internal combustion engine, e.g., a value of SOC at which the internal combustion engine is requested to be started, to a high value. Consequently, it is possible to prevent a lifetime of the battery from being reduced.

A second aspect of the invention relates to a control method for a vehicle which runs using at least one of driving forces of an internal combustion engine and a motor. The method includes the steps of:

driving the internal combustion engine to generate electric power, and charging a battery for supplying electric power to the motor with the generated electric power when a state of charge of the battery is reduced;

determining whether a load of the vehicle is larger than a predetermined set value; and starting the internal combustion engine to generate electric power earlier when it is determined that the load of the vehicle is larger than the predetermined set value, than when it is determined that the load is not larger than the predetermined set value.

In this method, the internal combustion engine is started to generate electric power earlier when a load of the vehicle is larger than a predetermined set value, than when the load is not larger than the predetermined set value, whereby discharge and charge of the battery are repeated at small intervals of time. Accordingly, when the load of the vehicle is large and a speed at which the SOC of the battery is reduced is high, it is possible to avoid a situation in which a large amount of electric power is discharged from the battery and the battery is charged with a large amount of electric power, and to suppress an increase in a temperature of the battery due to heat generation caused by charge/discharge.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, an embodiment of the invention will be described with reference to the accompanying drawings. In the description of the drawings, the same elements are denoted by the same reference numerals, and an overlapping description thereof will be omitted.

First Embodiment

Figure 1:
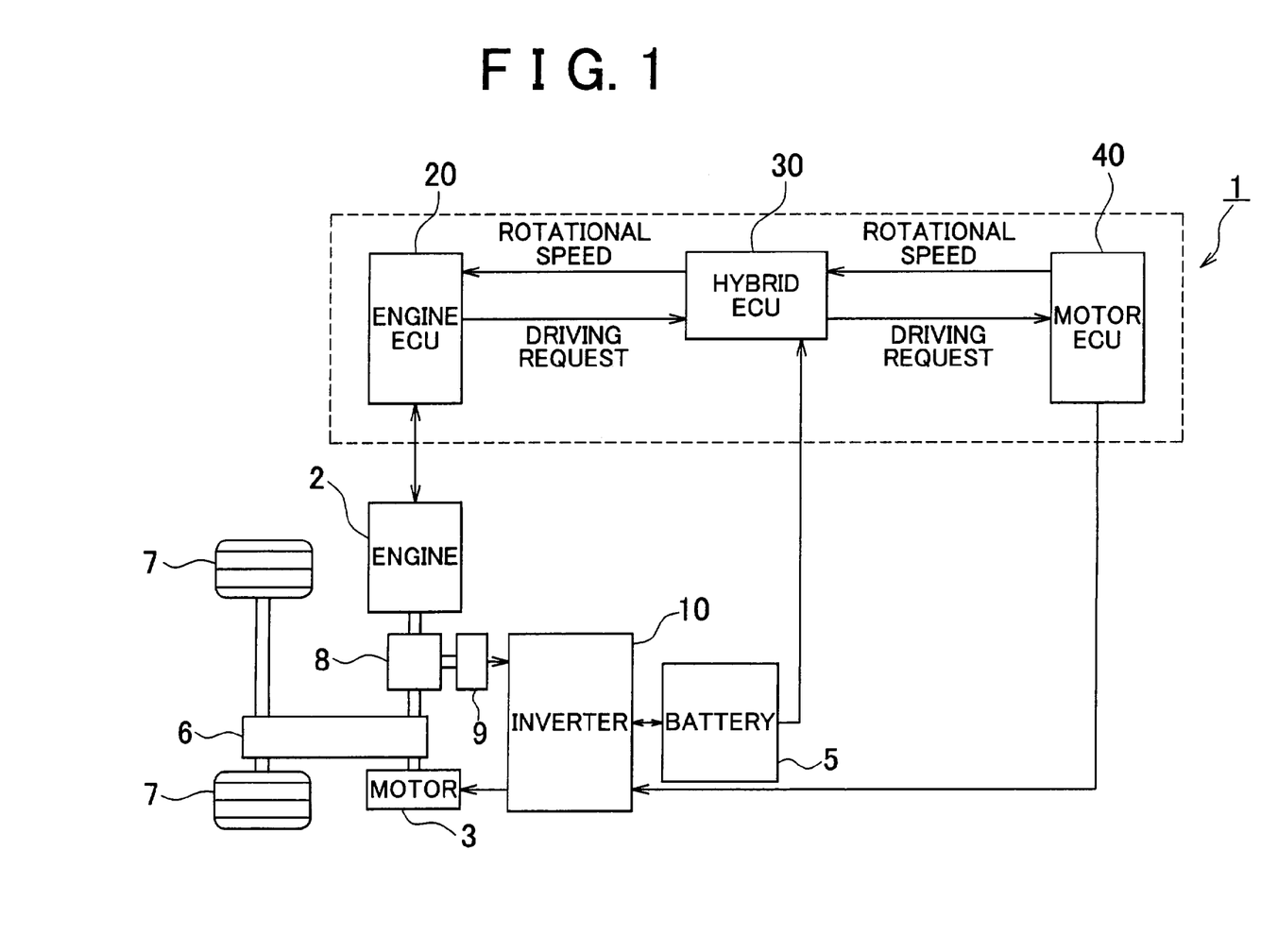
FIG. 1 is a diagram showing a configuration of a vehicle control apparatus according to an embodiment of the invention.

FIG. 1 is a schematic diagram showing a configuration of a vehicle control apparatus according to a first embodiment of the invention.

As shown in FIG. 1, a vehicle control apparatus 1 according to the first embodiment is mounted in a hybrid vehicle which includes an engine 2 and a motor 3, and which is able to run by the driving force of the engine 2 or the motor 3. The motor 3 receives electric power supplied by a battery 5 so as to be driven. The motor 3 is mechanically connected to driving wheels 7 via a differential 6 so as to transmit a driving force to the driving wheels 7. The engine 2 is mechanically connected to the driving wheels 7 via a power distributing mechanism 8 and the differential 6 so as to transmit the driving force to the driving wheels 7. As the power distributing mechanism 8, for example, a planetary gear mechanism is employed.

A generator 9 is connected to the power distributing mechanism 8. The generator 9 functions as electric power generating means which receives the driving force of the engine 2 or the driving wheels 7 so as to generate electric power. The generator 9 and the motor 3 are electrically connected to the battery 5 via an inverter 10. The alternating current electric power generated by the generator 9 is converted to direct current electric power by the inverter 10, and the battery 5 is charged with the direct current electric power. At this time, the battery 5 functions as storing means which stores the electric power generated by the generator 9 and supplies the electric power to the motor 3. The direct current electric power of the battery 5 is converted to alternating current electric power by the inverter 10, and the alternating current electric power is supplied to the motor 3. The motor 3 is driven by supply of the alternating current electric power.

The vehicle in which the vehicle control apparatus 1 is mounted is not limited to the aforementioned hybrid vehicle, and may be a vehicle provided with a motor generator which has functions of both a motor and a generator, as long as the vehicle can run using a driving force of one of an internal combustion engine and a motor, or driving forces of both of the motor and the generator. Also, the vehicle in which the vehicle control apparatus 1 is mounted may be a series type vehicle in which wheels are driven by a motor, and an engine is used as an electric power supply source for a generator, a parallel type vehicle in which both of an engine and a motor can drive the wheels, or the like.

In the vehicle control apparatus 1, an engine ECU 20, a hybrid ECU 30, and a motor ECU 40 are provided. The engine EUC 20 outputs a command signal for throttle opening of the engine 2 according to a driving request from the hybrid ECU 30. The motor ECU 40 outputs a driving signal for the motor 3 through the inverter 10 according to a driving request from the hybrid ECU 30, and is connected to the inverter 10.

The hybrid ECU 30 calculates a required engine output, motor torque, and the like based on accelerator opening, a vehicle speed, and the like. The hybrid ECU 30 outputs request signals for driving the engine 2 and the motor 3 to the engine ECU 20 and the motor ECU 40 so as to control the driving of the engine 2 and the motor 3. Then, the hybrid ECU 30 controls a state of charge (SOC) of the battery 5 so as to be maintained at a predetermined target value. For example, the hybrid ECU 30 detects the SOC of the battery 5, appropriately adjusts the engine output such that the SOC becomes the target value to generate electric power, and charges the battery 5 with the generated electric power to control the SOC.

In FIG. 1, the engine ECU 20, the hybrid ECU 30, and the motor ECU 40 are separately provided. However, all of them or two of them may be integrated.

Next, an operation of the vehicle control apparatus according to the embodiment will be described.

Figure 2:
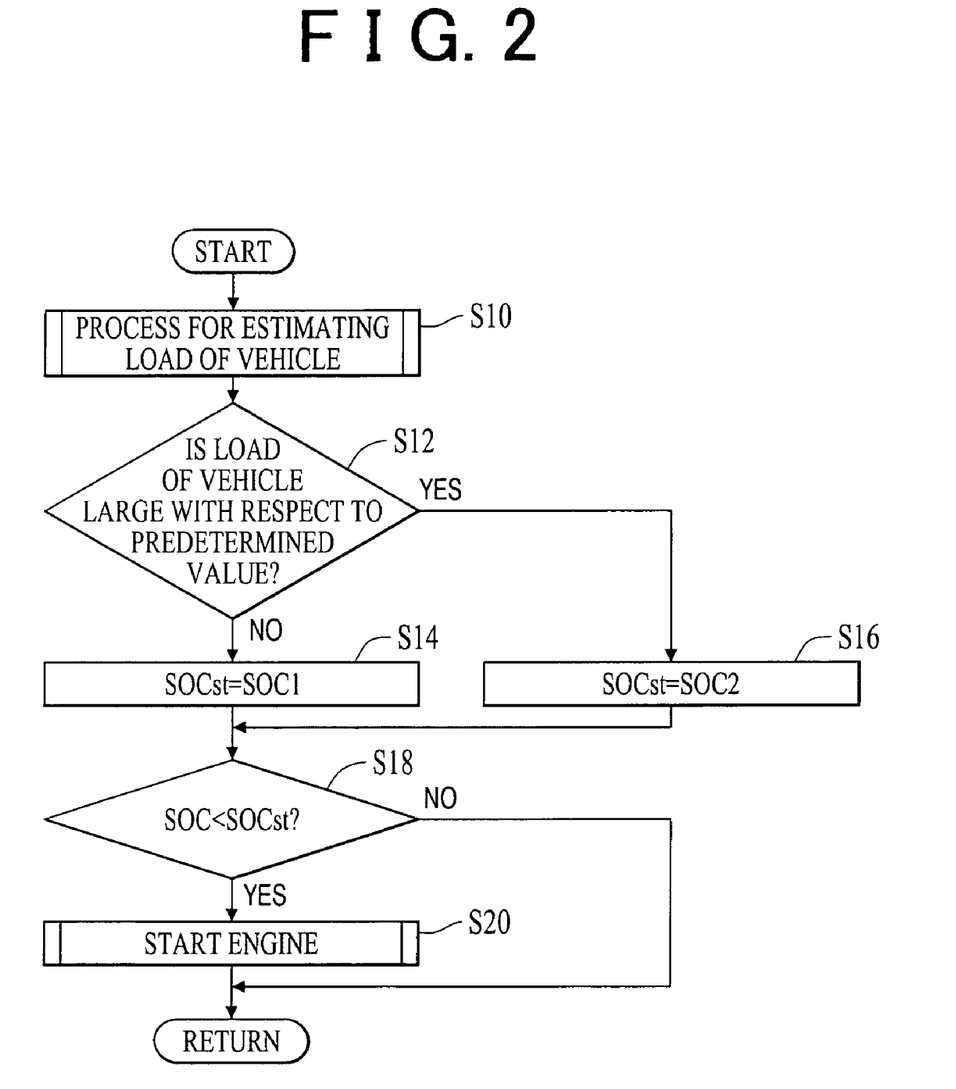
FIG. 2 is a flow chart showing an operation of a vehicle control apparatus in FIG. 1.

FIG. 2 is a flow chart showing the operation of the vehicle control apparatus 1 according to the embodiment. For example, processes in FIG. 2 are performed by the hybrid ECU 30 when the vehicle runs using only the driving force of the motor 3. As shown in step S110, a process for estimating a load of the vehicle is performed. The load of the vehicle is estimated, for example, based on vehicle acceleration and an amount of change in the SOC per a unit time ($\Delta$SOC) (in this case, the amount of change is a decrease amount because the vehicle runs using only the driving force of the motor 3). In this case, as the vehicle acceleration and the amount of change in the SOC per a unit time are larger, the load of the vehicle is estimated to be larger. In this case, the load of the vehicle is the load of the battery 5 because the vehicle runs using only the driving force of the motor 3

Also, the load of the vehicle may be estimated based on an amount of change in an altitude at which the vehicle exists per a unit time. Because the engine 2 stops while the process of the step 10 is executed, a value detected by a negative pressure sensor provided in the vehicle is equal to atmosphere pressure. Therefore, the amount of change in the altitude per a unit time can be estimated based on the detected value of the negative pressure sensor even if the accelerator pedal is depressed. Also, when the vehicle runs on steep ascending slope, it is difficult to increase the vehicle speed. Therefore, the amount of change in the altitude per a unit time can be estimated based on an opening amount of an accelerator and the vehicle speed. In this case, the amount of change in the altitude is a positive large value, the load of the vehicle is estimated to be large. Also, the load of the vehicle may be estimated based on presence or absence of an occupant detected by an occupancy sensor. In this case, as the number of the occupants is larger, the load of the vehicle is estimated to be larger. The load of the vehicle may be estimated based on weight on a loading space of the vehicle, or a signal of a strain gauge attached to a towing hook.

Further, when the vehicle is a refrigerated vehicle provided with a freezer, the load of the vehicle may be estimated based on an operating state of the freezer, a set temperature thereof, an air flow rate thereof, and the like. Also, when the vehicle is a garbage collecting vehicle, the load of the vehicle may be estimated based on a frequency with which a garbage collector is operated, and the like.

In step S12, it is determined whether or not the estimated load of the vehicle is larger than a predetermined set value. In other words, it is determined whether or not the load value of the vehicle estimated in step S110 is larger than a set value that is set in advance by the hybrid ECU 30. When it is determined that the load of the vehicle is not larger than the predetermined set value, a reference value SOCst for determining whether there is a request for starting the engine 2 is set to a value SOC1 (S14). As the value SOC, for example, 40% is set.

Meanwhile, when it is determined that the load of the vehicle is larger than the predetermined set value, the value SOCst is set to a value SOC2 which is higher than the value SOC1 (S16). In other words, the reference value SOCst is set to a higher value when the load of the vehicle is larger than the predetermined set value, than when the load of the vehicle is not larger than the predetermined set value. As the value SOC2, for example, 45% is set.

In step S18, it is determined whether or not the SOC of the battery 5 is lower than the reference value SOCst. When it is determined that the SOC of the battery 5 is not lower than the reference value SOCst, the control routine is terminated without starting the engine 2. Meanwhile, when it is determined that the SOC of the battery 5 is lower than the reference value SOCst, the engine 2 is started (S20). Generation of electric power is started by starting the engine, and the battery 5 is charged with the generated electric power.

As described above, according to the vehicle control apparatus 1 in the embodiment, the reference value SOCst is set to a higher value when the load of the vehicle is larger than the predetermined set value, whereby the charge and discharge of the battery 5 are repeated at small intervals of time.

Figure 3:
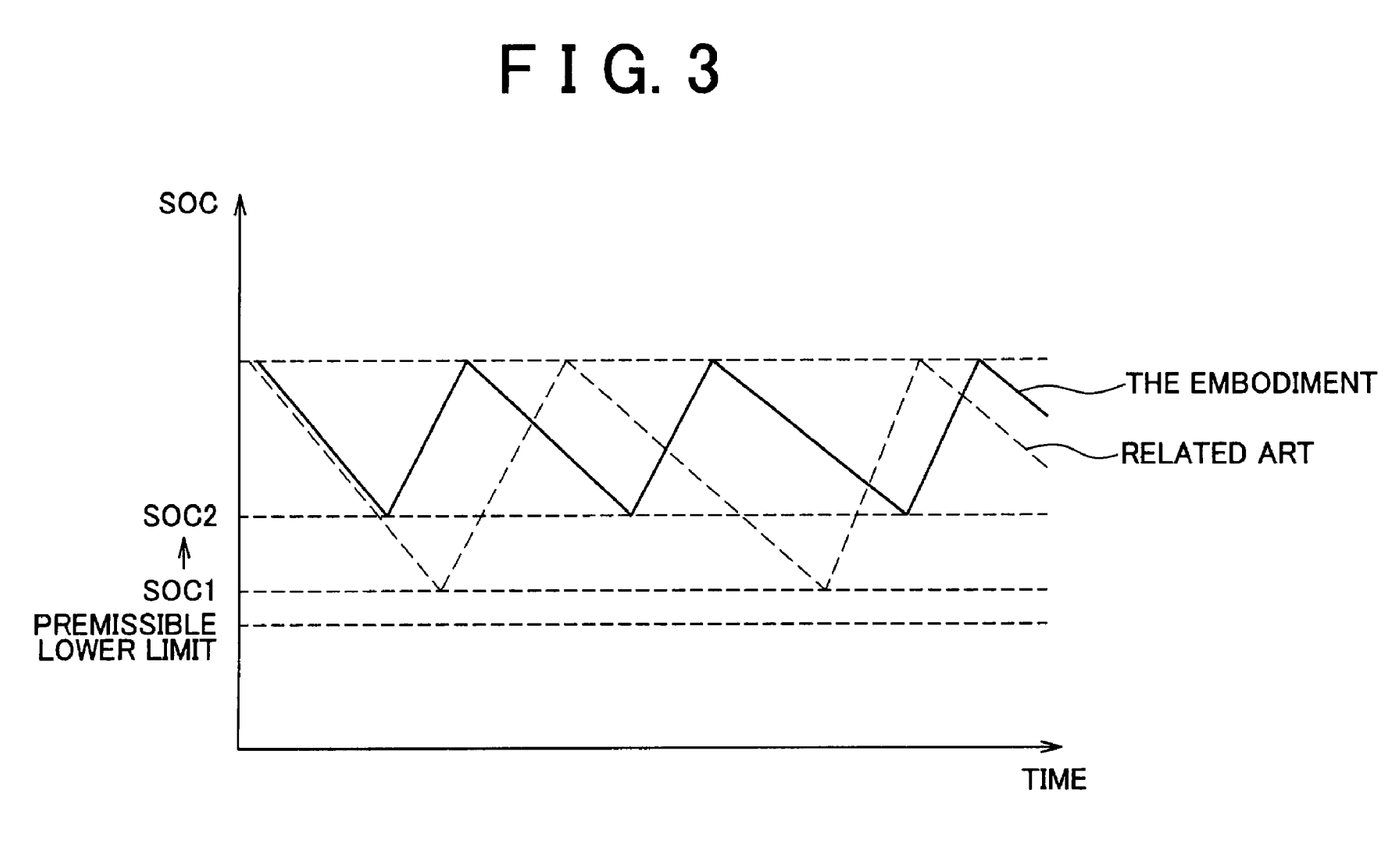
FIG. 3 is a diagram showing a change in a state of charge (SOC) of a battery in the vehicle control apparatus in FIG. 1 when a load of a vehicle is large.

In other words, as shown in FIG. 3, the reference value SOCst is set to the value SOC 2 which is higher than the value SOC 1, whereby the charge and discharge are repeated at small intervals of time (as shown by a solid line in FIG. 3) in a range in which a potential difference is small, and an amount of heat generation is reduced. Meanwhile, if the reference value SOCst remains low, the charge and discharge are repeated in a range in which a potential difference is large (as shown by a dashed line in FIG. 3), and the amount of heat generation is large. Thus, it is possible to avoid a situation in which a large amount of electric power is discharged from the battery 5 and the battery 5 is charged with a large amount of electric power, and to suppress an increase in a temperature of the battery 5 due to heat generation caused by charge/discharge, by setting the reference value SOCst to a higher value in the aforementioned manner.

Also, even when the SOC of the battery 5 is reduced suddenly, it is possible to avoid a situation in which the SOC of the battery becomes lower than a permissible lower limit and the battery 5 is brought into an excessive discharged state, by setting the reference value SOCst to a higher value. Consequently, it is possible to prevent a lifetime of the battery from being reduced.

Second Embodiment

Next, a vehicle control apparatus according to a second embodiment will be described.

The vehicle control apparatus according to the embodiment calculates vehicle request power, that is, power requested by the vehicle, and determines that the SOC of the battery 5 is being reduced and drives the internal combustion engine 2 so as to generate electric power when the vehicle request power is larger than a predetermined value.

The hardware structure of the vehicle control apparatus according to the embodiment is the same as the vehicle control apparatus according to the first embodiment shown in FIG. 1.

Figure 4:
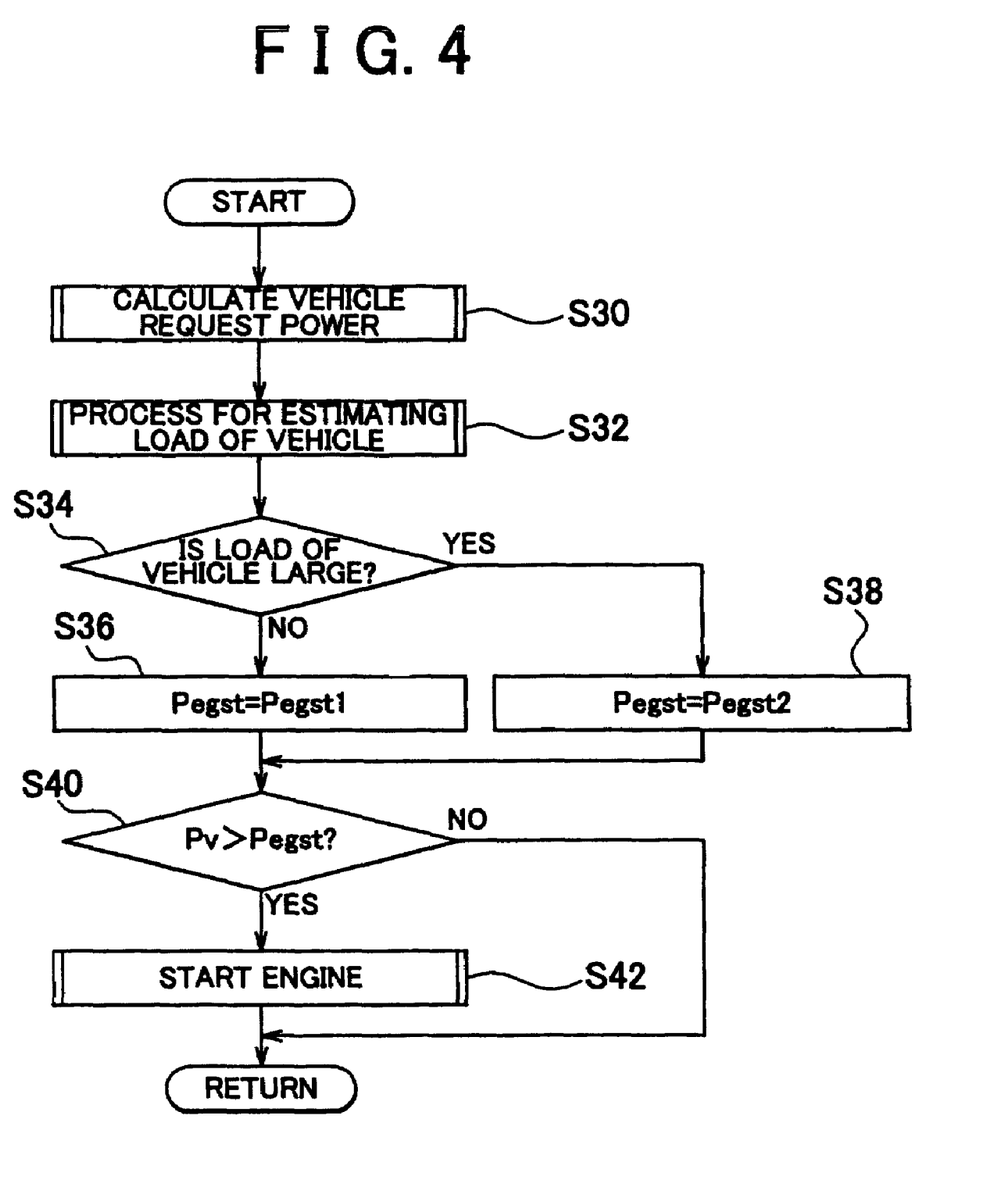
FIG. 4 is a flow chart showing an operation of a vehicle control apparatus according to a second embodiment of the invention.

FIG. 4 is a flowchart of an operation of the vehicle control apparatus according to the embodiment. For example, processes in FIG. 4 are performed by the hybrid ECU 30 when the vehicle runs using only the driving force of the motor 3.

As shown in step S30, first, vehicle request power (Pv) is calculated. The vehicle request power is calculated based on the sum of vehicle running request power, that is, power requested for vehicle running, and charge request electric power, that is, power requested for charging the battery 5. The vehicle running request power is calculated, for example, based on accelerator opening, a vehicle speed, and the like. Also, the charge request electric power is calculated, for example, based on the SOC of the battery 5.

In step S32, a process for estimating the load of the vehicle is performed. This process is performed in the same manner as in step S10 in FIG. 2. Then, in step S34, it is determined whether or not the estimated load of the vehicle is larger than a predetermined set value. In other words, it is determined whether or not the load value of the vehicle estimated in step S32 is larger than the set value that is set in advance by the hybrid ECU 30.

When it is determined that the load of the vehicle is not larger than the predetermined set value, an engine start set value Pegst is set to a value Pegst1 (S36). When the vehicle request power is larger than the engine start set value Pegst, the engine is started. The value Pegst1 is set to, for example, 15 kW. Meanwhile, when it is determined that the load of the vehicle is larger than the predetermined set value, the engine start set value Pegst is set to a value Pegst2 which is smaller than the value Pegst1 (S38). The value Pegst2 is set to, for example, 5 kW.

In step S40, it is determined whether or not the vehicle request power (Pv) is larger than the engine start set value Pegst. When the vehicle request power (Pv) is not larger than the engine start set value Pegst, the control routine is terminated without starting the engine 2. Meanwhile, when it is determined that the vehicle request power (Pv) is larger than the engine start set value Pegst, it is determined that the SOC of the battery 5 is being reduced to a large extent, and the engine 2 is started (S42). Generation of electric power is started by starting the engine, and the battery 5 is charged with the generated electric power.

As described above, according to the vehicle control apparatus in the embodiment, when the load of the vehicle is larger than the predetermined set value, the predetermined value concerning the vehicle request power, that is, the engine start set value Pegst is set to a smaller value, whereby the engine 1 is started easily for generating electric power, and discharge and charge of the battery 5 are repeated at small intervals of time. Therefore, when the load of the vehicle is large, and a speed at which the SOC of the vehicle is reduced is high, it is possible to avoid a situation in which a large amount of electric power is discharged from the battery 5 and the battery 5 is charged with a large amount of electric power, and to suppress an increase in a temperature of the battery 5 due to heat generation caused by charge/discharge.

Also, even when the SOC of the battery is reduced suddenly, it is possible to avoid a situation in which the SOC of the battery becomes lower than a permissible lower limit, by setting the engine start set value Pegst to a smaller value. Consequently, it is possible to prevent the lifetime of the battery 5 from being reduced.

As described above, according to the embodiment of the invention, it is possible to provide a vehicle control apparatus which can prevent the lifetime of the battery from being reduced.

In the illustrated embodiment, the controllers, e.g., the engine ECU 20, the hybrid ECU 30, and the motor ECU 40, are implemented with general purpose processors. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicle control apparatus which is mounted in a vehicle that runs using at least one of driving forces of an internal combustion engine and a motor, comprising:
    a controller:
        which starts the internal combustion engine to generate electric power, and charges a battery for supplying electric power to the motor with the generated electric power when a state of charge of the battery is reduced to a reference value for determining whether there is a request for starting the internal combustion engine, and
        which starts the internal combustion engine to generate electric power earlier and sets the reference value to a higher value, when a load of the vehicle is larger than a predetermined set value, than when the load of the vehicle is not larger than the predetermined set value,
    wherein the vehicle control apparatus determines the load of the vehicle based on the load of the battery, and
    wherein the vehicle control apparatus determines that, as a decreased amount of the state of charge of the battery per a unit time is larger, the load of the vehicle is larger.

2. The vehicle control apparatus according to claim 1, wherein the load of the vehicle is the load of the battery.

3. The vehicle control apparatus according to claim 1, wherein the vehicle control apparatus drives the internal combustion engine such that an electric generator mounted in the vehicle generates electric power.

4. The vehicle control apparatus according to claim 3, wherein the motor is used also as the electric generator.

5. A vehicle control apparatus which is mounted in a vehicle that runs using at least one of driving forces of an internal combustion engine and a motor, comprising:
    a controller:
        which starts the internal combustion engine to generate electric power, and charges a battery for supplying electric power to the motor with the generated electric power when a state of charge of the battery is reduced, and
        which starts the internal combustion engine to generate electric power earlier when a load of the vehicle is larger than a predetermined set value, than when the load of the vehicle is not larger than the predetermined set value,
    wherein the vehicle control apparatus estimates a magnitude of the load of the vehicle when the vehicle is running only by the driving force of the motor,
    wherein the vehicle control apparatus determines the load of the vehicle based on the load of the battery, and
    wherein the vehicle control apparatus determines that, as a decreased amount of the state of charge of the battery per a unit time is larger, the load of the vehicle is larger.

6. The vehicle control apparatus according to claim 5, wherein the load of the vehicle is the load of the battery.

7. The vehicle control apparatus according to claim 5, wherein the vehicle control apparatus drives the internal combustion engine such that an electric generator mounted in the vehicle generates electric power.

8. The vehicle control apparatus according to claim 7, wherein the motor is used also as the electric generator.

9. A vehicle control apparatus which is mounted in a vehicle that runs using at least one of driving forces of an internal combustion engine and a motor, comprising:
    a controller:
        which starts the internal combustion engine to generate electric power, and charges a battery for supplying electric power to the motor with the generated electric power when a state of charge of the battery is reduced, and
        which starts the internal combustion engine to generate electric power earlier when a load of the vehicle at the moment when the vehicle is running by the driving force of the motor is larger than a predetermined set value, than when the load of the vehicle is not larger than the predetermined set value,
    wherein the vehicle control apparatus calculates power requested by the vehicle based on a sum of power requested for running the vehicle and electric power requested for charging the battery, determines that the state of charge of the battery is reduced and starts the internal combustion engine to generate electric power when the power becomes larger than a predetermined value, and sets the predetermined value concerning the power to a smaller value when the load of the vehicle is larger than the predetermined set value, than when the load of the vehicle is not larger than the predetermined set value.

10. The vehicle control apparatus according to claim 9, wherein the vehicle control apparatus determines the load of the vehicle based on the load of the battery.

11. The vehicle control apparatus according to claim 10, wherein the load of the vehicle is the load of the battery.

12. The vehicle control apparatus according to claim 9, wherein the vehicle control apparatus drives the internal combustion engine such that an electric generator mounted in the vehicle generates electric power.

13. The vehicle control apparatus according to claim 12, wherein the motor is used also as the electric generator.

14. A control method for a vehicle which runs using at least a driving force of a motor, comprising:
    driving an internal combustion engine to generate electric power, and charging a battery for supplying electric power to the motor with the generated electric power when a state of charge of the battery is reduced;
    determining a load of the vehicle based on a load of a battery when the vehicle is running only by the driving force of the motor;
    determining whether the load of the vehicle is larger than a predetermined set value;
    wherein the step of determining the load of the vehicle includes determining that as a decreased amount of the state of charge of the battery per a unit time is larger, the load of the vehicle is larger; and
    starting the internal combustion engine to generate electric power earlier when a determination is made that the load of the vehicle is larger than the predetermined set value, than when a determination is made that the load of the vehicle is not larger than the predetermined set value.

15. A control method for a vehicle which runs using at least a driving force of a motor, comprising:
   driving an internal combustion engine to generate electric power, and charging a battery for supplying electric power to the motor with the generated electric power when a state of charge of the battery is reduced;
   determining a load of the vehicle based on a load of a battery;
   determining whether the load of the vehicle is larger than a predetermined set value;
   wherein the step of determining the load of the vehicle includes determining that as a decreased amount of the state of charge of the battery per a unit time is larger, the load of the vehicle is larger;
   starting the internal combustion engine to generate electric power earlier when a determination is made that the load of the vehicle is larger than the predetermined set value, than when a determination is made that the load of the vehicle is not larger than the predetermined set value;
   determining whether a state of charge of the battery has been reduced to a reference value for determining whether there is a request for starting the internal combustion engine; and
   starting the internal combustion engine to generate electric power and charging the battery with the generated electric power when a determination is made that the state of charge of the battery is reduced to the reference value, wherein the reference value is set to a higher value when a determination is made that the load of the vehicle is larger than a predetermined set value, than when a determination is made that the load of the vehicle is not larger than the predetermined set value.

16. A control method for a vehicle which runs using at least a driving force of a motor, comprising:
   driving an internal combustion engine to generate electric power, and charging a battery for supplying electric power to the motor with the generated electric power when a state of charge of the battery is reduced;
   determining a load of the vehicle based on a load of a battery;
   determining whether the load of the vehicle is larger than a predetermined set value;
   wherein the step of determining the load of the vehicle includes determining that as a decreased amount of state of charge of the battery per a unit time is larger, the load of the vehicle is larger;
   starting the internal combustion engine to generate electric power earlier when a determination is made that the load of the vehicle is larger than the predetermined set value, than when a determination is made that the load of the vehicle is not larger than the predetermined set value,
   calculating power requested by the vehicle; and
   determining whether the calculated power is larger than a predetermined value;
   wherein when the calculated power is larger than the predetermined value, a determination is made that the state of charge of the battery is reduced, and the internal combustion engine is started to generate electric power; and
   the predetermined value is set to a smaller value when a determination is made that the load of the vehicle is larger than the predetermined set value, than when a determination is made that the load of the vehicle is not larger than the predetermined set value.

17. A vehicle control apparatus which is mounted in a vehicle that runs using at least a driving force of a motor, comprising:
   a controller which determines a reference value based on a load of the vehicle in comparison to a predetermined set value, and which starts a control of an internal combustion engine to charge a battery for supplying electric power to the motor with electric power when a state of charge of the battery becomes equal to or lower than the reference value for starting the control of the internal combustion engine, wherein the load of the vehicle is based on at least one of an amount of change per unit time in altitude of the vehicle, and a weight of a load placed on the vehicle,
   wherein said controller estimates the amount of change in the altitude per a unit time based on an opening degree of an accelerator pedal and a vehicle speed.

18. The vehicle control apparatus according to claim 17, wherein the control of the internal combustion engine is a control for starting the internal combustion engine.

19. A vehicle control apparatus which is mounted in a vehicle that runs using at least a driving force of a motor, comprising:
   a controller;
   wherein said controller calculates power requested by a vehicle based on a load of the vehicle and starts a control of an internal combustion engine, to charge a battery for supplying electric power to the motor with electric power, based on the calculated power, wherein the load of the vehicle is based on at least one of an amount of change per unit time in altitude of the vehicle, and a weight of a load placed on the vehicle, and
   said controller calculates an estimate of the amount of change in an altitude per a unit time based on an opening degree of an accelerator pedal and a vehicle speed.

20. The vehicle control apparatus according to claim 19, wherein the control of the internal combustion engine is a control for starting the internal combustion engine.

21. The vehicle control apparatus according to claim 20, wherein in the control of the internal combustion engine, the internal combustion engine is started when the calculated power becomes equal to or larger than a predetermined value, and
   the controller determines the predetermined value based on the load of the internal combustion engine.

22. A vehicle control apparatus which is mounted in a vehicle that runs using at least a driving force of a motor, comprising:
   a controller which starts an internal combustion engine to generate electric power, and charges a battery for supplying electric power to the motor with the generated electric power when a state of charge of the battery discharges at a rate greater than a reference rate, and which starts the internal combustion engine to generate electric power earlier when a load of the vehicle is larger than a predetermined set value, than when the load of the vehicle is not larger than the predetermined set value,
   wherein the vehicle control apparatus determines the load of the vehicle based on the load of the battery, and
   wherein the vehicle control apparatus determines that, as a decreased amount of the state of charge of the battery per a unit time is larger, the load of the vehicle is larger.

\* \* \* \* \*